United States Patent
Meier

[11] 3,749,455
[45] July 31, 1973

[54] ADJUSTABLE BEARING

[76] Inventor: Johann Meier, Casa Clarissa, CH-6645 Brione Sopra Minusio, Switzerland

[22] Filed: Sept. 14, 1971

[21] Appl. No.: 180,417

[30] Foreign Application Priority Data
Sept. 15, 1970 Switzerland............ 13632/70

[52] U.S. Cl. .................... 308/6 R, 64/22
[51] Int. Cl. ............................. F16c 21/00
[58] Field of Search ............ 308/6 R, 4 R; 287/110, 52 R; 64/23

[56] References Cited
UNITED STATES PATENTS

| | | | |
|---|---|---|---|
| 3,194,611 | 7/1965 | Mahony | 308/4 R |
| 3,622,211 | 11/1971 | Mitton | 308/6 R |
| 2,909,393 | 10/1959 | Price et al. | 308/4 R |

Primary Examiner—Charles J. Myhre
Assistant Examiner—R. H. Lazarus
Attorney—Pierce, Scheffler & Parker

[57] ABSTRACT

An adjustable bearing for a cylindrical member includes at least two guide rollers provided with at least three points of support distributed over the circumference of the cylindrical member. One of the guide rollers is so arranged as to be tiltable in a radial plane of the bearing to a smaller diameter.

7 Claims, 5 Drawing Figures

ADJUSTABLE BEARING

The present invention relates to an adjustable bearing for guiding or holding a cylindrical part, which bearing has at least two guide rollers with at least three points of support distributed over the circumference of the cylindrical part to be supported, at least one of the guide rollers being tiltable in a radial plane of the bearing to a smaller diameter.

Adjustable bearings are already known which, however, have the disadvantage that they are relatively complicated in construction and manufacture, accurate adjustment thereof is very difficult and tedious and, owing to their adjustability, they are not very rigid. Other known adjustable bearings require very much space in the axial direction, which renders them useless for many purposes.

It is the object of the invention to provide an adjustable bearing which does not have these disadvantages.

The bearing according to the invention is characterized in that the tiltable guide roller or rollers is or are supported in a roller holding part 7 extending at least approximately perpendicularly to the longitudinal axis of the bearing forming one piece with a bearing holding part 6 and flexible about an axis extending perpendicularly to the longitudinal axis of the bearing, and in that adjusting means 10, acting in the axial direction of the bearing are provided for tilting the flexible roller holding part 7 relative to the bearing holding part 6.

It is advantageous if the bearing has at least three guide rollers of which at least one is tiltable in a radial plane to a smaller diameter.

The invention is described by way of example in the following with reference to the accompanying drawings, in which.

Figure 1:
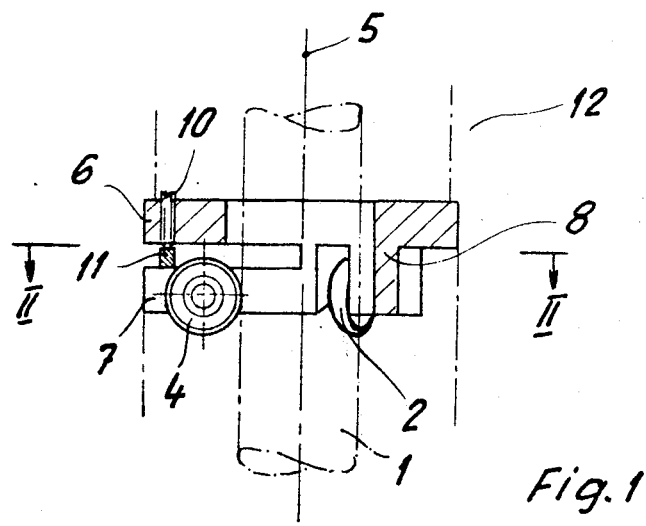
FIG. 1 shows a longitudinal section through a first embodiment of an adjustable bearing.
Figure 2:
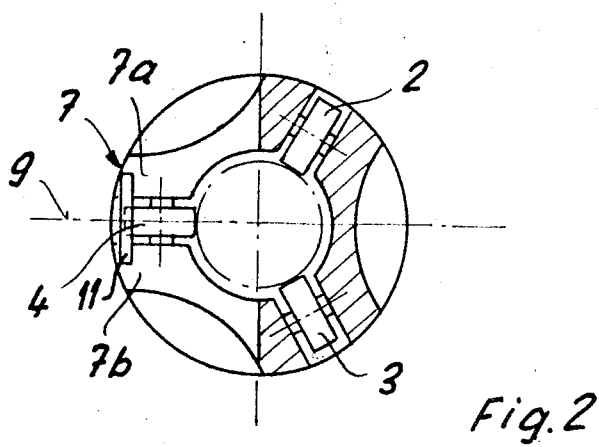
FIG. 2 shows a section on the line II—II in FIG. 1.

As will be seen from FIGS. 1 and 2, the adjustable bearing for guiding a bolt or pin 1 in its longitudinal direction has three guide rollers, 2, 3 and 4, whose axes of rotation are perpendicular to the longitudinal axis 5 of the bearing.

The bearing has a cylindrical bearing holding part 6 and a roller holding part 7 spaced away in the axial direction from the said bearing holding part, both parts being rigidly connected together by a part 8 of the bearing circumference situated opposite the roller 4 such that a tilting axis is formed, which is perpendicular to a radial plane 9 of the bearing, passing through the roller 4. In this way, the guide roller 4 is adjustable to a smaller diameter in the radial plane 9 of the bearing by means of an adjusting screw 10 rotatable in the bearing holding part 6 by rotation of the adjusting screw 10 towards the roller holding part 7.

To obtain a uniform distribution of the pressure exerted by the adjusting screw 10 on the two tilting parts 7a and 7b of the roller holding part 7, the said adjusting screw acts uniformly on the two parts 7a and 7b by means of an intermediate yoke 11.

The guide rollers 2, 3 and 4 are arranged in the roller holding part 7 such that in the untightened condition of the latter they confine a very slightly larger diameter than that of the pin 1 to be guided. After the insertion of the pin 1 into the bearing mounted securely in an apparatus part 12 by means of the bearing holding part 6, the guide roller 4, by screwing of the adjusting screw 10 into the bearing holding part 6, can be tilted slightly in the radial plane 9 until the pin 1 is guided free from play by the three guide rollers 2, 3 and 4.

Figure 3:
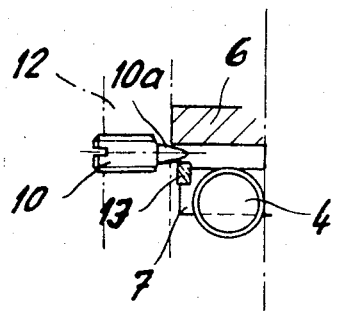
FIG. 3 shows a part of the bearing illustrated in FIG. 1 having another arrangement for the adjustment of the bearing.

Unless the fitting conditions do not permit it, it is also possible to mount rotatably in the apparatus part 12 an adjusting screw 10, extending radially and projecting between the bearing holding part 6 and the roller holding part 7, as shown in FIG. 3. The adjusting screw 10 has a conical tip 10a engaging the bearing holding part 6 and an intermediate yoke 13 bridging the recess in the roller holding part 7 for the guide roller 4. In this embodiment, the entire bearing is fixed at the same time by the adjusting screw 13 in its axial position in the bore of the apparatus part 12.

Figure 4:
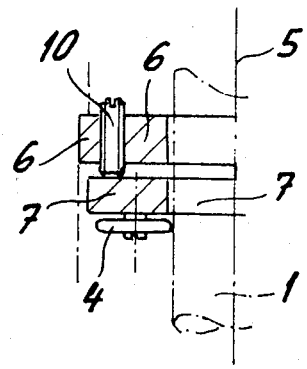
FIG. 4 shows a part of a longitudinal section similar to FIG. 1 but through an adjustable bearing for holding a rotating part.

FIG. 4 shows an adjustable bearing for holding a rotating shaft 1. The construction is in principle the same as in the bearing shown in FIG. 1 with the exception that the axes of rotation of the guide rollers 2, 3 and 4 are parallel to the bearing longitudinal axis 5. Since the axis of rotation of the guide roller 4 on adjustment by means of the adjusting screw 10 is inclined slightly to the longitudinal axis 5 of the bearing, the guide surface of the roller 4 is rounded.

The guide rollers 2, 3 and 4 may be formed for example by ball bearings or needle bearings. Of course, it is also possible to mount the axles of the guide rollers rotatably in the roller holding part 7.

Figure 5:
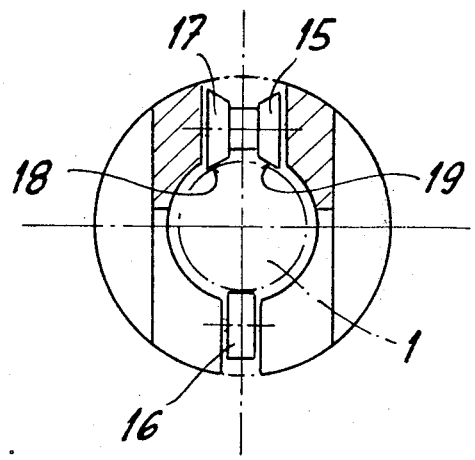
FIG. 5 shows a section similar to FIG. 2 through another embodiment of an adjustable bearing.

FIG. 5 shows a section similar to FIG. 2 through an embodiment of an adjustable bearing provided with only two guide rollers 15 and 16.

The guide roller 15 has a V-shaped recess 17 running along its circumference which recess bears at two points of contact 18 and 19 on the part 1 to be guided. The tiltable guide roller 16 can be constructed as in the embodiment example shown in FIGS. 1 and 2.

I claim:

1. An adjustable bearing for a cylindrical part, which bearing comprises an annular bearing holding part adapted to encircle a cylindrical part to be supported;

said bearing holding part including integral therewith a roller holding part extending substantially perpendicularly to the longitudinal axis of the bearing and flexible about an axis extending perpendicularly to the longitudinal axis of the bearing;

at least two guide rollers rotatably supported by and spaced about said bearing holding part, said guide rollers providing in toto at least three points of contact with such cylindrical part to be supported;

at least one of said guide rollers being rotatably supported by said extended roller holding part and tiltable in a radial plane of the bearing to a smaller diameter, and adjusting means acting in the axial direction of the bearing to tilt said flexible roller holding part relative to the bearing holding part.

2. Bearing according to claim 1, characterized in that said guide rollers are three in number, of which at least one is said tiltable guide roller.

3. Bearing according to claim 1, wherein said adjusting means comprises an adjusting screw rotatably mounted in the bearing holding part and adjustable parallel to the bearing longitudinal axis, which screw is functionally engageable with said flexible roller holding part.

4. Bearing according to claim 1, characterized in that the guide rollers are two in number, and in that at least one of said guide rollers is provided on its outer circumference with a V-shaped recess for guiding the cylindrical part to be supported.

5. Bearing according to claim 2, characterized in that the axes of rotation of the guide rollers are perpendicular to the bearing longitudinal axis.

6. Bearing according to claim 2, characterized in that the axes of rotation of the guide rollers are parallel to the bearing longitudinal axis.

7. Bearing according to claim 1, characterized in that the guide rollers comprise rolling bearings.

* * * * *